United States Patent [19]
Kim et al.

[11] Patent Number: 5,883,682
[45] Date of Patent: Mar. 16, 1999

[54] STRUCTURE OF A LIQUID CRYSTAL DISPLAY AND METHOD OF MANUFACTURING THE SAME

[75] Inventors: Jeong Hyun Kim, Anyang; Kyoung Nam Lim, Seoul; Jae Yong Park, Kunpo, all of Rep. of Korea

[73] Assignee: LG Electronics, Inc., Seoul, Rep. of Korea

[21] Appl. No.: 896,208

[22] Filed: Jul. 17, 1997

[30] Foreign Application Priority Data

Mar. 19, 1997 [KR]  Rep. of Korea ................... 1997-9367

[51] Int. Cl.⁶ ......................... G02F 1/136; G02F 1/1343
[52] U.S. Cl. .......................... 349/43; 349/38; 349/122; 349/138
[58] Field of Search ............................. 349/42, 43, 46, 349/38, 39, 122, 138, 139

[56] References Cited

U.S. PATENT DOCUMENTS

| | | | |
|---|---|---|---|
| 5,757,453 | 5/1998 | Shin | 349/122 |
| 5,763,899 | 6/1998 | Yamazaki et al. | 257/59 |

*Primary Examiner*—William L. Sikes
*Assistant Examiner*—Kenneth Parker
*Attorney, Agent, or Firm*—Graham & James LLP

[57] ABSTRACT

A method of manufacturing an active panel of a liquid crystal display reduces the steps of a masking process and prevents line disconnection of a conductive material forming a pixel electrode which is caused by undercutting and eliminates a stepped profile formed during the etching processes. Materials forming a gate insulating layer, a semiconductor layer, an impurity doped semiconductor layer, and source and drain electrodes are sequentially deposited on a substrate. The source and drain electrodes are formed. Then, the semiconductor layer and the gate insulating layer are simultaneously formed. Thus, the mask processes in the method are reduced. However, this method results in a severe stepped profile caused by simultaneously etching the materials under the source and drain electrodes during the step of forming the source and drain electrode. As a result, line disconnection occurs due to the stepped profile during the forming step of a pixel electrode. In order to prevent this problem, a protection layer made of an organic material is formed prior to the step of forming the pixel electrode, resulting in a smooth surface and elimination of line disconnecting.

24 Claims, 12 Drawing Sheets

STRUCTURE OF A LIQUID CRYSTAL DISPLAY AND METHOD OF MANUFACTURING THE SAME

BACKGROUND OF THE INVENTION

1. Field of the Invention

The present invention relates to an active matrix liquid crystal display (AMLCD) having a thin film transistor (TFT) and a pixel electrode connected with the TFT and arranged in a matrix pattern, and a method manufacturing the same, and more particularly, the present invention relates to a method of manufacturing an active panel of the AMLCD for simplifying the manufacturing process and reducing defects in the active panel.

2. Description of the Related Art

Among various display devices displaying picture images on a screen, thin film type flat panel display devices are widely used because they are relatively thin and light weight. Liquid crystal displays are actively being developed and studied because the LCDs provide a sufficiently high resolution and a sufficiently fast response time to display a motion picture.

The principle of the LCD uses optical anisotrophy and polarization properties of liquid crystal materials. The liquid crystal molecules are relatively thin and long and have orientation and polarization properties. Using these properties, the orientation in which the liquid crystal molecules are arranged can be controlled by applying an external electric field. Depending on the orientation of the liquid crystal molecules, light is allowed to either pass through the liquid crystal or is prevented from passing through the liquid crystal. A liquid crystal display effectively uses this characteristic behavior of liquid crystal.

Recently, AMLCDs which include TFTs and pixel electrodes arranged in a matrix pattern have received much attention because they provide enhanced picture quality and natural colors.

The structure of a conventional liquid crystal display is described below. The conventional liquid crystal display includes two panels each having many elements disposed thereon, and a liquid crystal layer formed between the two panels. The first panel or color filter panel located at a first side of the conventional liquid crystal display includes red (R), green (G), and blue (B) color filters sequentially arranged to correspond with an array of pixels disposed on a transparent substrate of the first panel. Between these color filters, a black matrix is arranged in a lattice pattern. A common electrode is formed and disposed on the color filters.

On the other side or second side of the conventional liquid crystal display, the second panel or active panel includes a plurality of pixel electrodes which are located at positions corresponding to positions of pixels and are disposed on a transparent substrate. A plurality of signal bus lines are arranged to extend in a horizontal direction of the pixel electrodes whereas a plurality of data bus lines are arranged in the vertical direction of the pixel electrodes. At a corner of the pixel electrode, a thin film transistor is formed to apply an electric signal to the pixel. The gate electrode of the thin film transistor is connected to a corresponding one of the signal bus lines (or gate bus lines), and the source electrode of the thin film transistor is connected to a corresponding one of the data bus lines (or source bus lines). The end portions of the gate and source bus lines include terminals or pads for receiving signals applied externally thereto.

The above described first and second panels are bonded together and arranged to face each other while being spaced apart by a predetermined distance (known as a cell gap) and a liquid crystal material is injected between the two panels into the cell gap.

The manufacturing process for the conventional liquid crystal panel is rather complicated and requires many different manufacturing steps. More particularly, the active panel having TFTs and pixel electrodes requires many manufacturing steps. Therefore, it is beneficial to reduce the manufacturing steps to reduce the possible defects which may occur during the manufacture of the active panel and to reduce the time, expense and difficulty involved in manufacturing the active panel of the liquid crystal display.

A conventional method of manufacturing an active panel of an AMLCD is described below in terms of a masking process. FIG. 1 is an enlarged plan view of an active panel of an AMLCD and FIGS. 2a–2f are cross-sectional views showing the manufacturing process of the active panel taken along line II—II in FIG. 1.

A first metal is vacuum deposited on a substrate 11 and patterned to form a gate electrode 13, a gate bus line 15 and a gate pad 17, using a first masking process (FIG. 2a).

An insulating material 19a such as silicone nitride and silicone oxide, an intrinsic semiconducting material 21a, an impurity doped semiconducting material 23a and a second metal are preferably sequentially vacuum deposited on the substrate including the first metal, and the second metal is patterned to form a source electrode 33, a drain electrode 43, a source bus line 35 and a source pad 37 using a second masking process (FIG. 2b).

Using the source electrode 33, the drain electrode 43, the source bus line 35 and the source pad 37 as masks, the exposed portion of the impurity doped semiconducting material 23a is removed to form an impure semiconductor layer 23. This is to remove completely the impurity doped semiconducting material 23a located between the source electrode 33 and the drain electrode 43. As a result, an additional mask is not necessary for this process (FIG. 2c).

Next, the insulating material 19a and the intrinsic semiconducting material 21a are simultaneously removed to form a gate insulating layer 19 and a semiconductor layer 21 at an active area located above the gate electrode 13, using a masking process. At this time, the insulating material 19a and the semiconducting material 21a covering the gate bus line 15 and the gate pad 17 are completely removed, whereas the insulating material 19a and the semiconducting material 21a under the source bus line 35 and the source pad 37 remain (FIG. 2d).

An inorganic protection layer 39 is formed on the substrate including the source bus line 33, the drain electrode 43, the gate pad 17 and the source pad 37, by depositing an insulating material such as silicone nitride and silicone oxide. The inorganic protection layer 39 is, then, patterned to form a drain contact hole 61, a gate pad contact hole 63 and a source pad contact hole 65, which expose the drain electrode 43, the gate pad 17 and the source pad 37, respectively, using a fourth masking process (FIG. 2e).

Indium tin oxide is vacuum deposited on the protection layer 39 and, using a fifth masking process, is patterned to form a pixel electrode 53, a gate pad connecting terminal 57 and a source pad connecting terminal 77. The pixel electrode 53 is connected with the drain electrode 43 through the drain contact hole 61, the gate pad connecting terminal 57 is connected with the gate pad 17 through the gate pad contact hole 63 and the source pad connecting terminal 77 is connected with the source pad 37 through the source pad contact hole 65 (FIG. 2f).

Further, additional masking processes may be included, when the gate pad 17 is formed according to a different method or when other elements described as above are to be formed.

In the manufacture of the conventional active panel, there arises a problem of line disconnection during the deposition of indium tin oxide for forming the pixel electrode 53 because of a presence of a stepped profile formed at a location where the pixel electrode 53 and the drain electrode 43 are connected. The stepped profile is formed by the drain electrode 43 extending beyond the edge of the semiconductor layer 21, the doped semiconductor layer 23 and the gate insulating layer 19 (FIGS. 3a, 3b). Undercutting which occurs during the etching processes (FIG. 2d) and is caused by simultaneously etching the semiconducting material 21a, the doped semiconducting material 23a and the gate insulating layer 19, creates the stepped profile. As a result, line disconnection of the pixel electrode 53 occurs at a location marked LD. As a result of this line disconnection of the pixel electrode 53, the production yield of the active panel is reduced.

SUMMARY OF THE INVENTION

To overcome the problems discussed above, the preferred embodiments of the present invention provide an active panel of a liquid crystal display requiring a reduced number of patterning steps.

The preferred embodiments of the present invention also provide a simplified manufacturing process for manufacturing an active panel of a liquid crystal display.

The preferred embodiments of the present invention also provide an active panel of a liquid crystal display having reduced defects by introducing an additional inorganic protection layer or plasma treatment using $N_2$ gas.

According to a preferred embodiment of the present invention, a method of manufacturing a liquid crystal display includes the steps of: forming a first conductive layer by depositing and patterning a first conductive material on a substrate; sequentially depositing an insulating material, an intrinsic semiconducting material, an impurity doped semiconducting material and a second conductive material on the first conductive layer; forming a second conductive layer and an impurity doped semiconductor layer by patterning the second conductive material and the impurity doped semiconducting material; patterning the semiconductor material and the first inorganic insulating material to expose a portion of the first conductive layer; forming an organic protection layer having a plurality of contact holes to expose a portion of the first conductive layer and a portion of the second conductive layer by depositing and patterning an organic insulating material on the substrate including the second conductive layer; and forming a third conductive layer connected with a portion of the first conductive layer and a portion of the second conductive layer through the contact holes, by depositing and patterning a third conductive material on the substrate including the organic protection layer.

Further scope of applicability of the present invention will become apparent from the detailed description of preferred embodiments given hereinafter. However, it should be understood that the detailed description and specific examples, while describing preferred embodiments of the invention, are given by way of illustration only, since various changes and modifications within the spirit and scope of the invention will become apparent to those skilled in the art from this detailed description.

These and other elements, features, and advantages of the preferred embodiments of the present invention will be apparent from the following detailed description of the preferred embodiments of the present invention, as illustrated in the accompanying drawings.

BRIEF DESCRIPTION OF THE DRAWINGS

The present invention will become more fully understood from the detailed description of preferred embodiments provided below and the accompanying drawings which are given by way of illustration only, and thus are not limitative of the present invention, and wherein.

DETAILED DESCRIPTION OF PREFERRED EMBODIMENTS

A method of manufacturing an active panel according to preferred embodiments of the present invention is as follows.

A first metal is vacuum deposited on a substrate and patterned to form a gate electrode, a gate bus line and a gate pad. A first insulating material, a semiconducting material, an impurity doped semiconducting material and a second metal are sequentially deposited on the substrate including the gate electrode, the gate bus line and the gate pad. Then, the second metal is patterned to form a source electrode, a drain electrode, a source bus line and a source pad. Using the source electrode, the drain electrode, the source bus line and the source pad as masks, the exposed portion of the impurity doped semiconducting layer is removed. The semiconducting layer and the first insulating layer are patterned to form a semiconductor layer and a gate insulating layer. An organic layer is coated on a portion of the substrate including the source electrode, the drain electrode, the source bus line and the source pad to form a protection layer. The protection layer is patterned to form contact holes on the drain electrode, the gate pad and the source pad, respectively. A transparent conductive material is vacuum deposited on the substrate including the protection layer and patterned to form a pixel electrode, a gate pad connecting terminal and a source pad connecting terminal.

Figure 1:
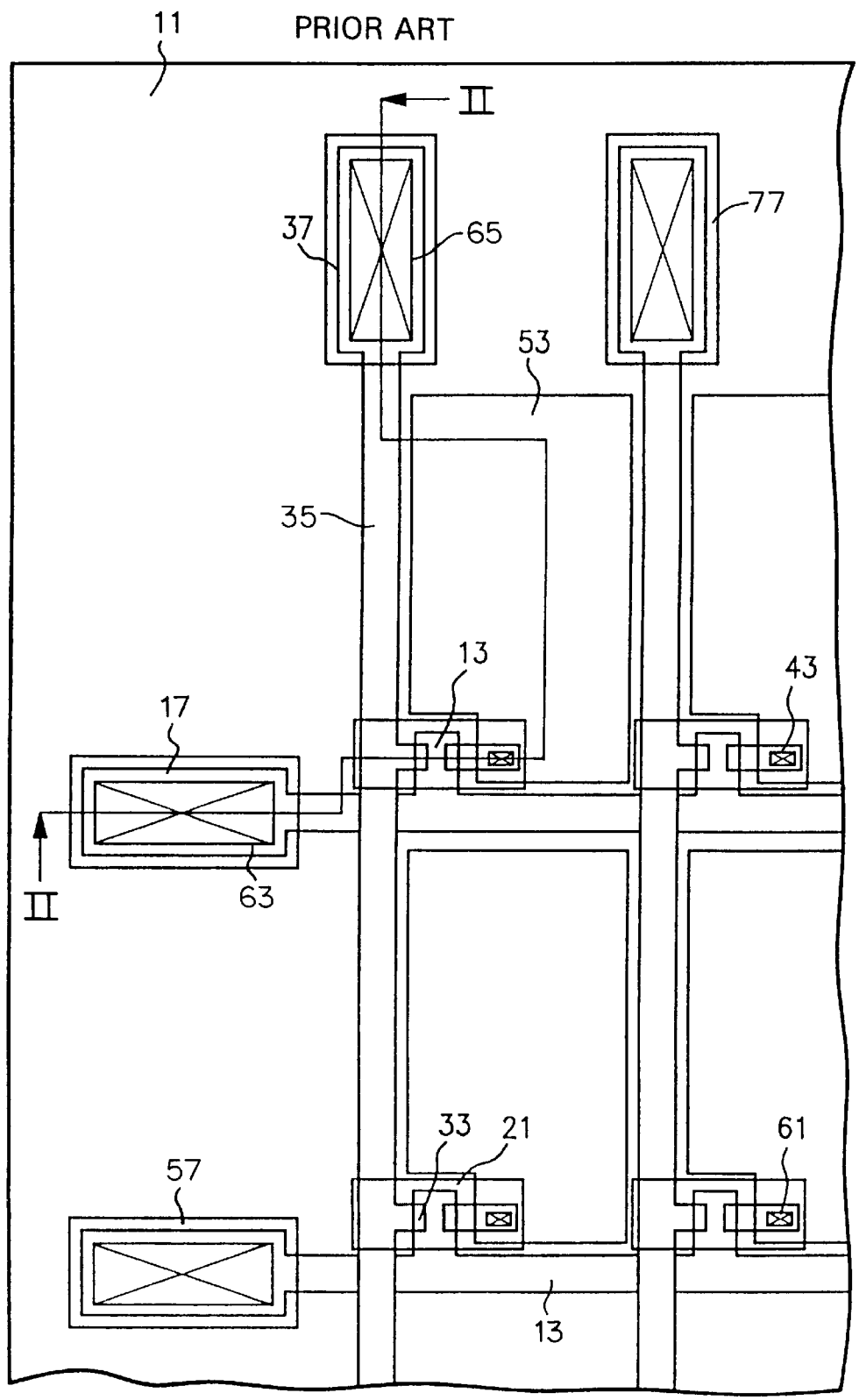
FIG. 1 is an enlarged plan view showing the structure of a conventional active panel.
Figure 2A:
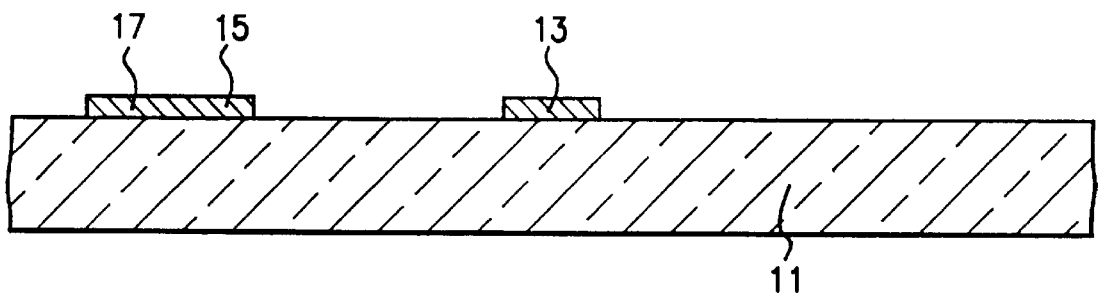
FIGS. 2a–2f are cross-sectional views showing the steps of manufacturing a conventional active panel.
Figure 2B:
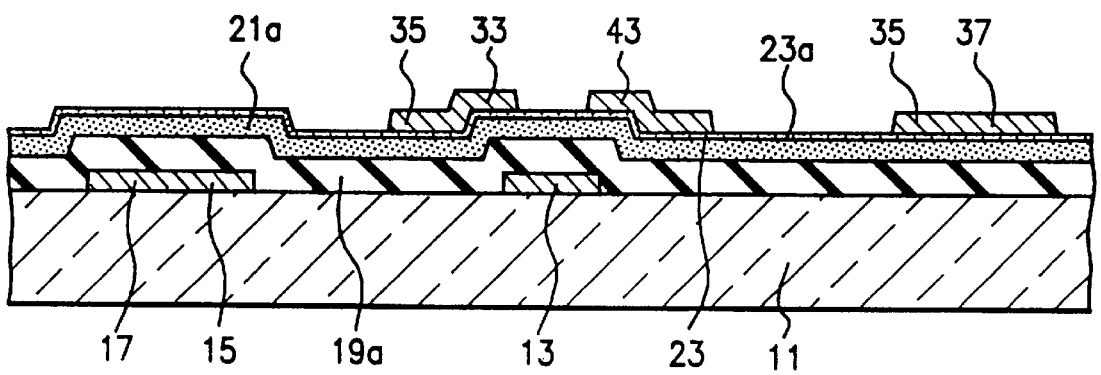
Figure 2C:
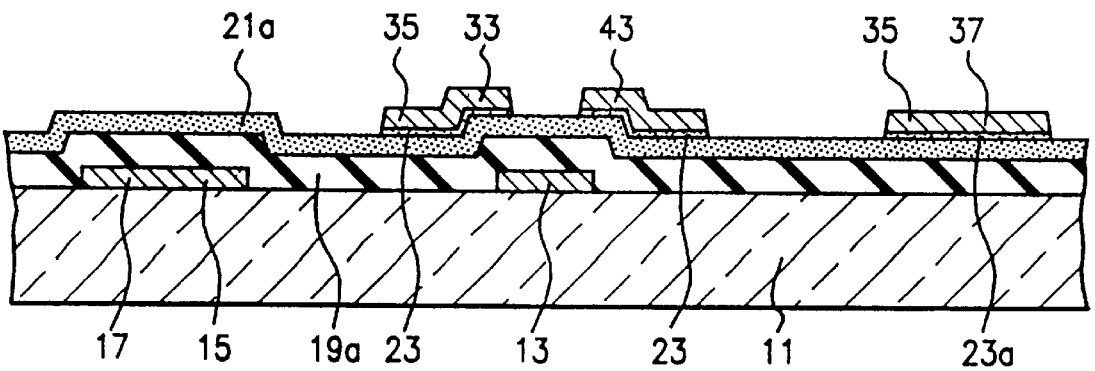
Figure 2D:
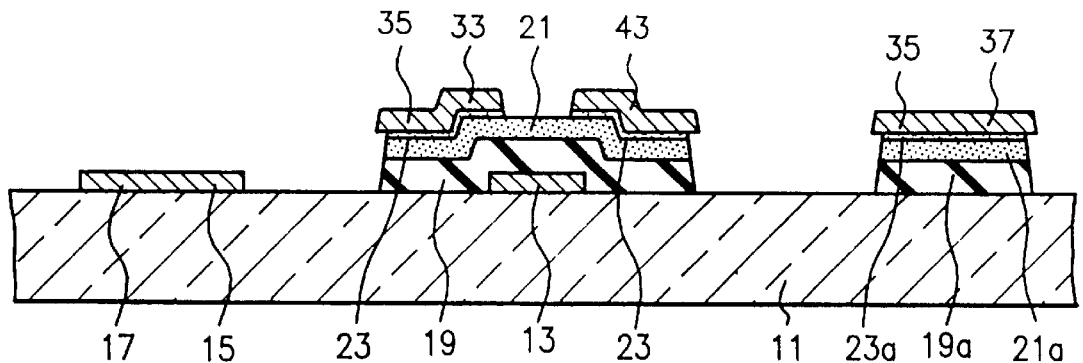
Figure 2E:
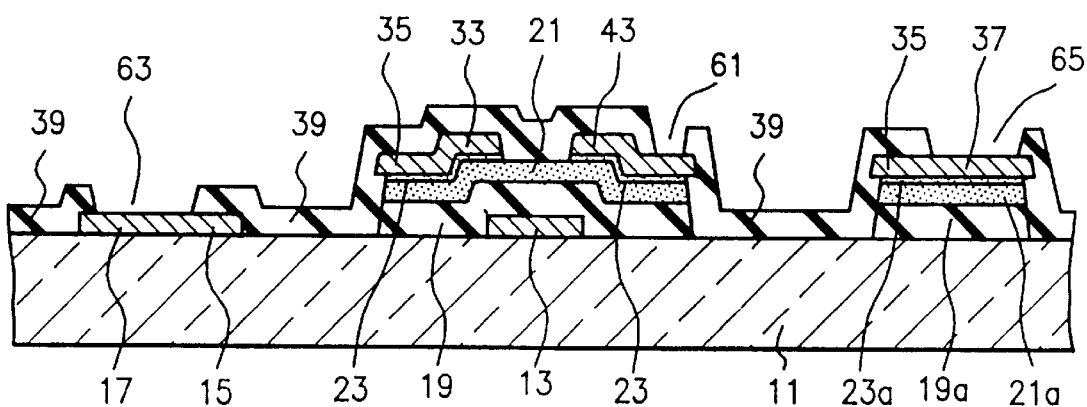
Figure 2F:
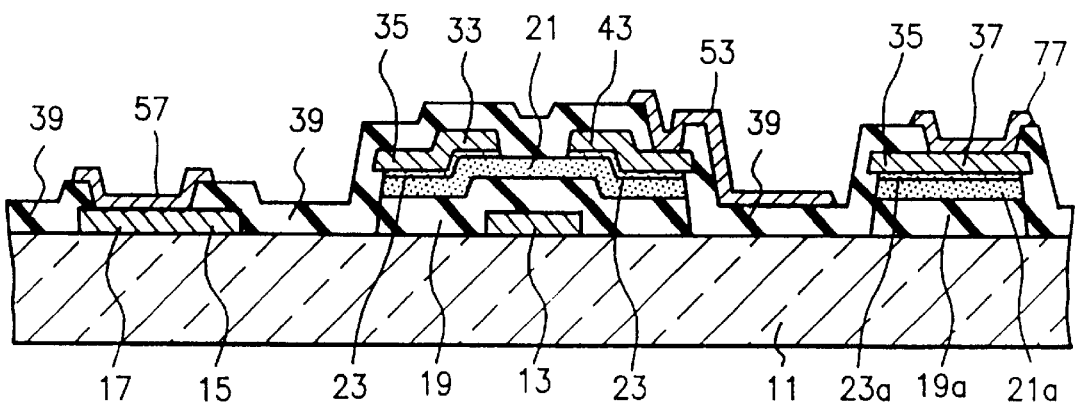
Figure 3A:
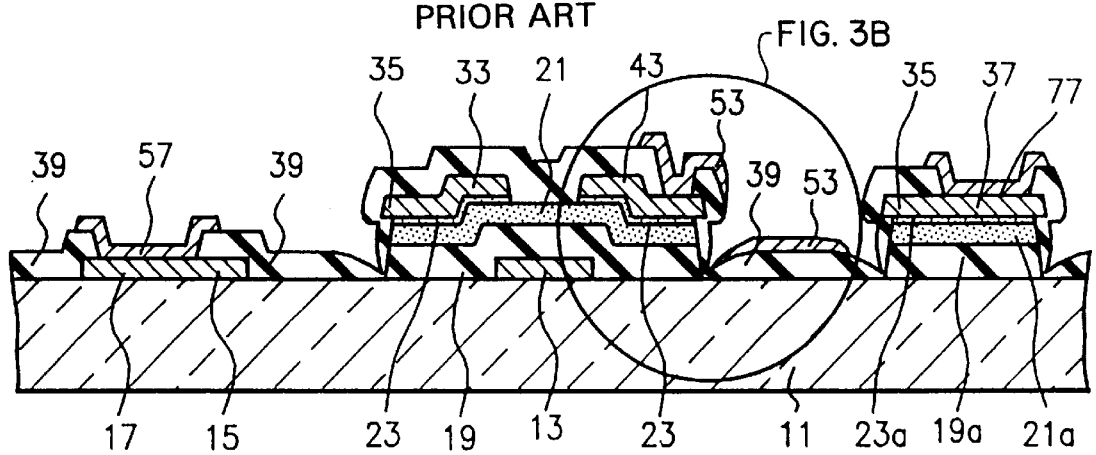
FIGS. 3a and 3b are enlarged plan views showing line disconnection due to undercutting in a conventional active panel.
Figure 3B:
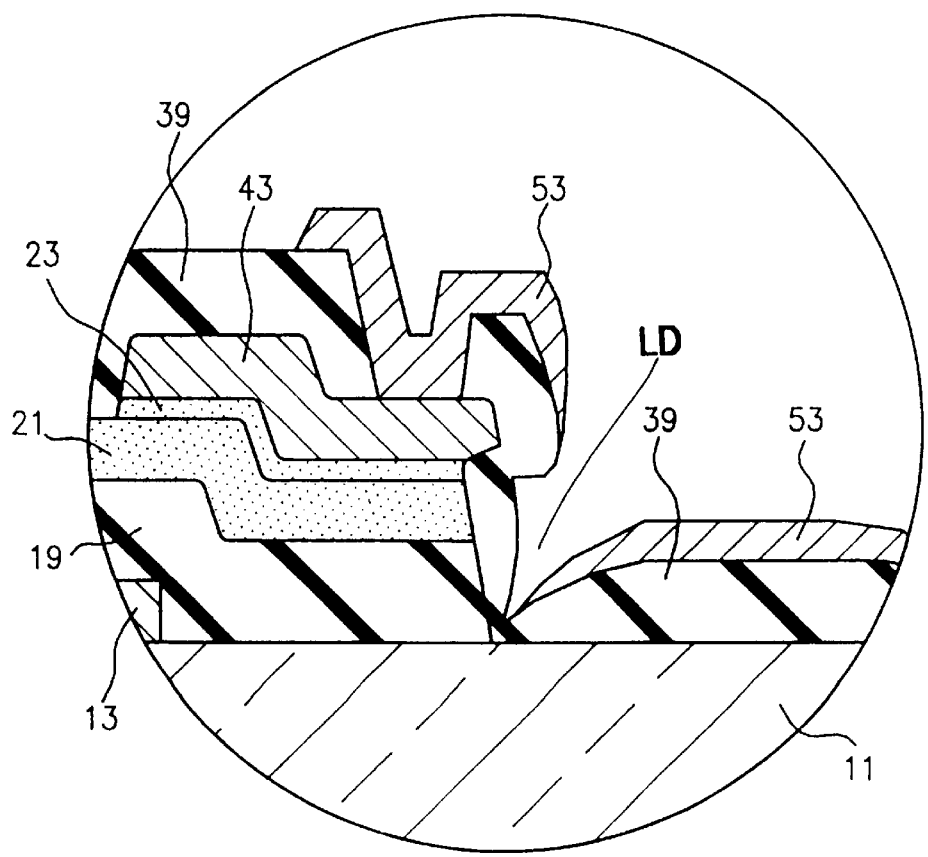
Figure 4:
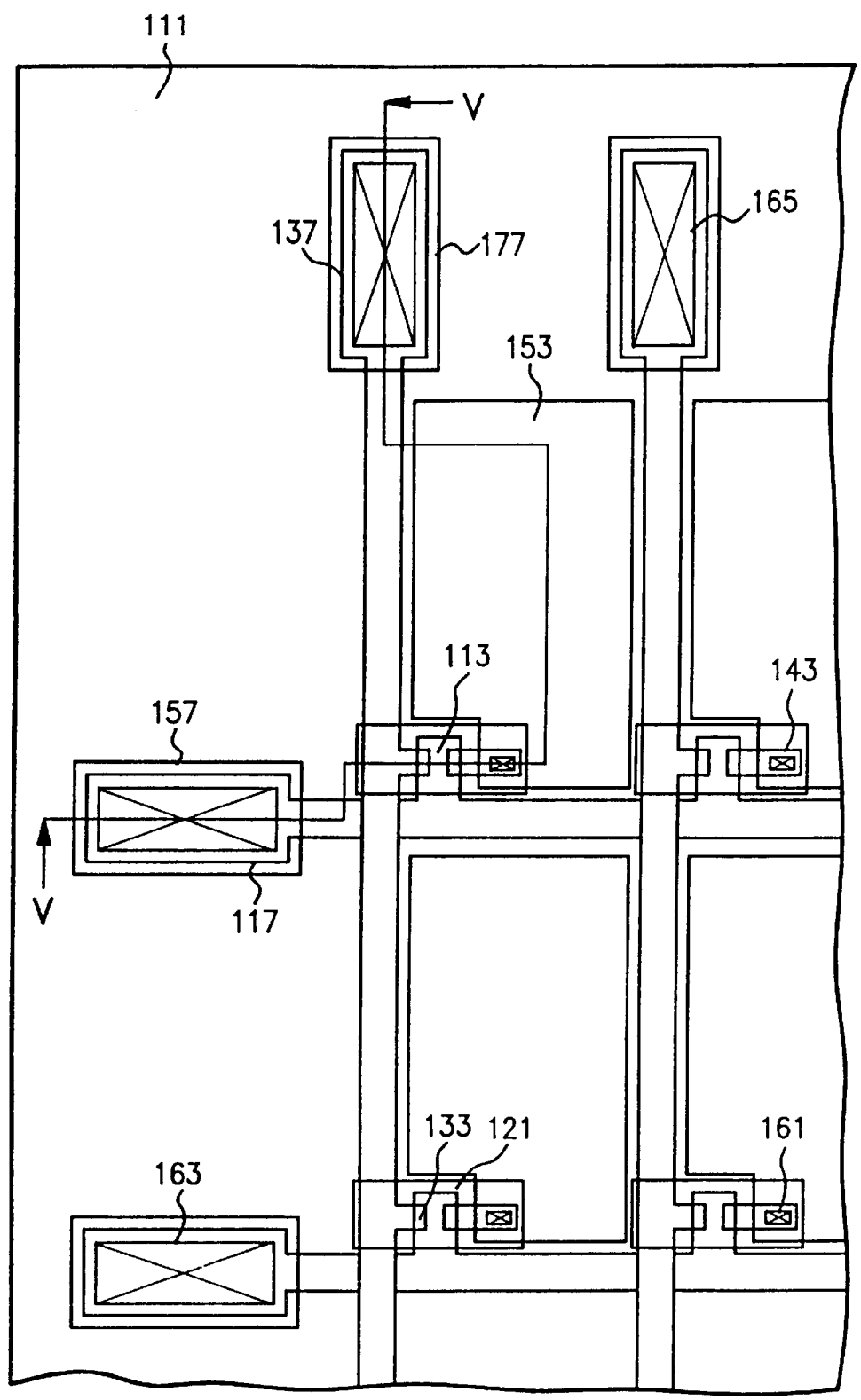
FIG. 4 is an enlarged plan view showing the structure of an active panel according to a preferred embodiment of the present invention.

The method of manufacturing an active panel according to the present invention is described in more detail with reference to preferred embodiments. FIG. 4 is an enlarged plan view showing the structure of an active panel according to a preferred embodiment of the present invention. FIGS. 5a–5f are cross-sectional views showing the steps of manufacturing the active panel taken along line V—V in FIG. 4.

EXAMPLE 1

Figure 5A:
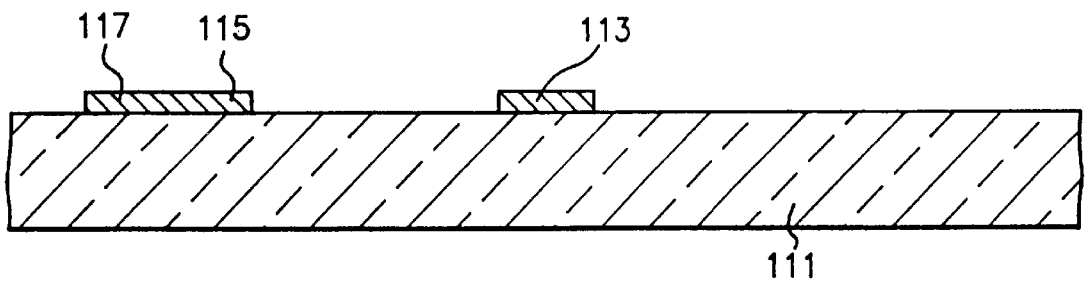
FIGS. 5a–5f are cross-sectional views showing the steps of manufacturing an active panel according to a preferred embodiment of the present invention.

A first metal including aluminum is vacuum deposited on a substrate 111 and, using a first masking process, is patterned to form a gate electrode 113, a gate bus line 115 and a gate pad 117. The gate electrode 113 is preferably formed at a corner of a pixel electrode which is arranged in a matrix pattern. The gate bus line 115 connects the gate electrodes 113 in a row direction. The gate pad 117 is preferably formed at an end of the gate bus line 115, which is preferably connected to a terminal of an external driving circuit (FIG. 5a).

Figure 5B:
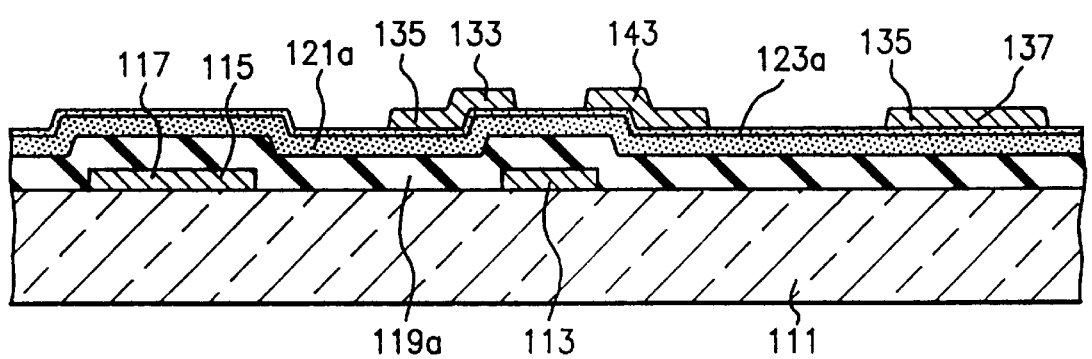

An inorganic insulating material 119a such as silicone nitride and silicone oxide, an intrinsic semiconducting material 121a such as a pure amorphous silicone, an impurity doped semiconducting material 123a such as impurity doped silicone and a second metal including chromium are sequentially deposited on the substrate including the gate electrode 113, the gate bus line 115 and the gate pad 117. The second metal is patterned to form a source electrode 133, a source bus line 135 and a source pad 137, using a second masking process. The source electrode 133 overlaps a portion of the gate electrode 113 with the semiconducting material 121a, the impurity doped semiconducting material 123a and the inorganic insulating material 119a being disposed therebetween. The drain electrode 143 is separated from the source electrode 133 and overlaps another portion of the gate electrode 113 with the semiconducting material 121a, the impurity doped semiconducting material 123a and the inorganic insulating material 119a being disposed therebetween. The source bus line 135 connects the source electrodes 133 in a column direction. The source pad 137 is preferably formed at an end of the source bus line 135 (FIG. 5b).

Figure 5C:
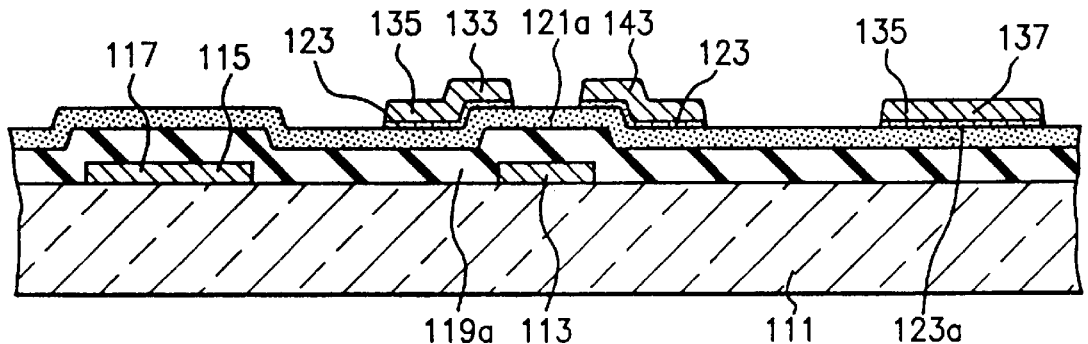

The exposed portion of the impurity doped semiconducting material 123a is removed by dry etching method to form a impurity doped semiconductor layer 123 (FIG. 5c).

Figure 5D:
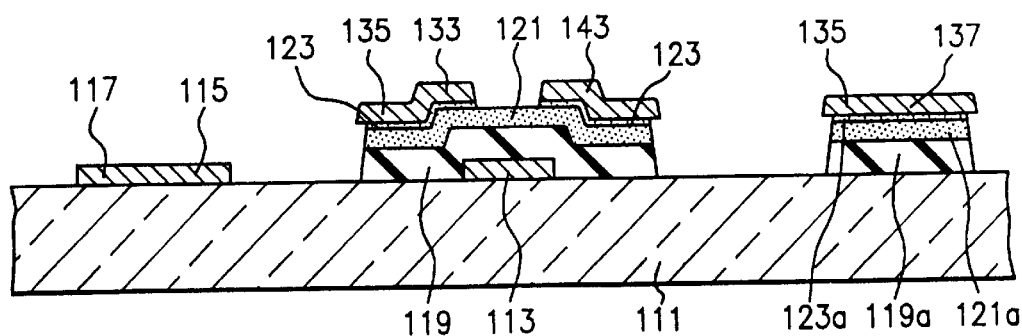

Using a third masking process, the inorganic insulating material 119a and the intrinsic semiconducting material 121a are patterned to form a semiconducting layer 121 as a channel layer over the gate electrode 113. At the same time, the gate pad 117 is exposed completely. The source pad 137 is also exposed completely and a dummy thin film layer of the impurity doped semiconducting material 123a and the semiconducting material 121a remains thereunder (FIG. 5d).

Figure 5E:
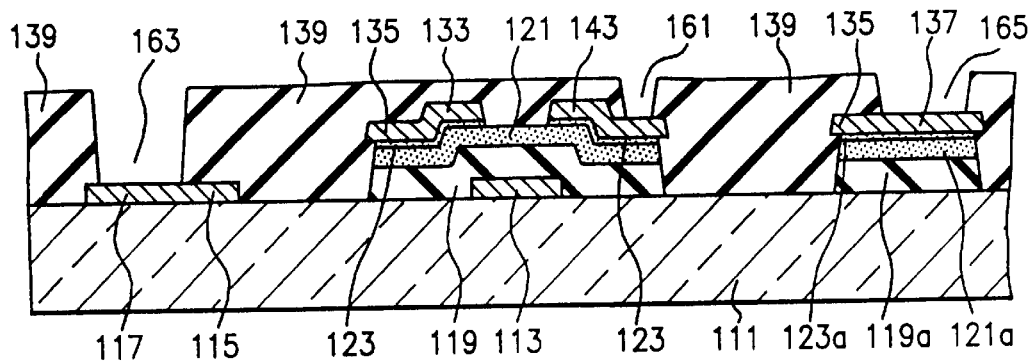

An organic material such as BCB (benzocyclobutene), PFCB (perfluorocyclobutane) and fluorinated para-xylene is preferably coated on the substrate 111 including the source electrode 133, the source bus line 135 and the source pad 137 to form an organic protection layer 139. Using a fourth masking process, the organic protection layer 139 is patterned to form a drain contact hole 161, a gate pad contact hole 163 and a source pad contact hole 165. The drain contact hole 161 is formed by removing the portion of the organic protection layer 139 covering the drain electrode 143 to expose the drain electrode 143. The gate pad contact hole 163 is formed by removing the portion of the organic protection layer 139 covering the gate pad 117 to expose the gate pad 117. The source pad contact hole 165 is formed by removing the organic protection layer 139 covering the source pad 137 to expose the source pad 137 (FIG. 5e).

Figure 5F:
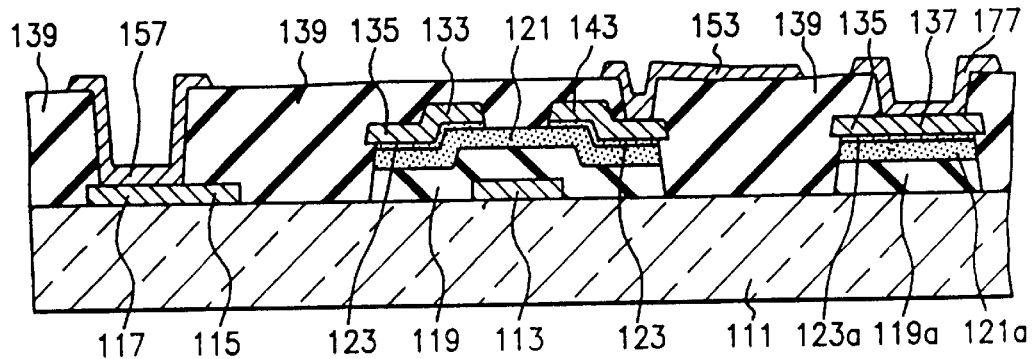

Indium tin oxide is vacuum deposited on the substrate including the protection layer 139 and, using a fifth masking process, patterned to form a pixel electrode 153, a gate pad connecting terminal 157 and a source pad connecting terminal 177. The pixel electrode 153 is connected with the drain electrode 143 through the drain contact hole 161. The gate pad connecting terminal 157 is connected with the gate pad 117 through the gate pad contact hole 163. The source pad connecting terminal 177 is connected with the source pad 137 through the source pad contact hole 165 (FIG. 5f).

When the semiconducting layer 121 and the gate insulating layer 119a are removed by etching as in the third masking process in this preferred embodiment, since wet etching is used, there occurs undercutting layers under the metal layer at locations such as the source electrode 133, the drain electrode 143 and the source pad 137. Thus, a stepped profile occurs and line disconnection may result at the undercut portion when overlay deposition is applied over the stepped surface.

Figure 6A:
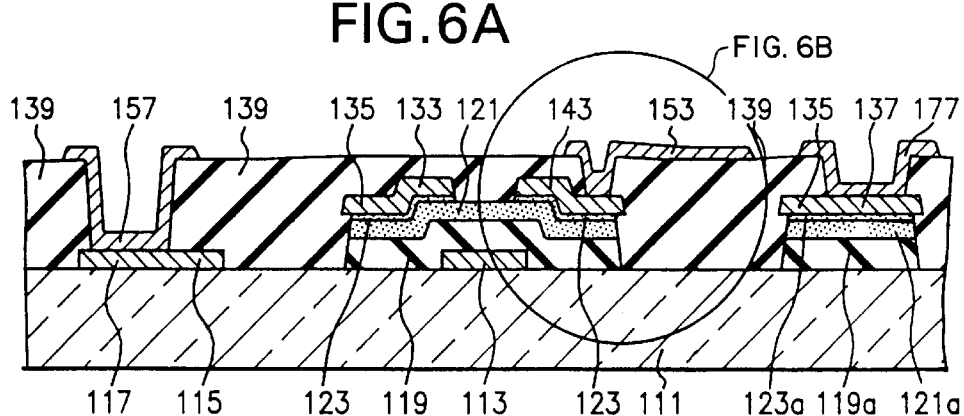
FIGS. 6a–6b are enlarged plan views showing the structure of an active panel according to a preferred embodiment of the present invention in which line disconnection caused by undercutting has been eliminated.
Figure 6B:
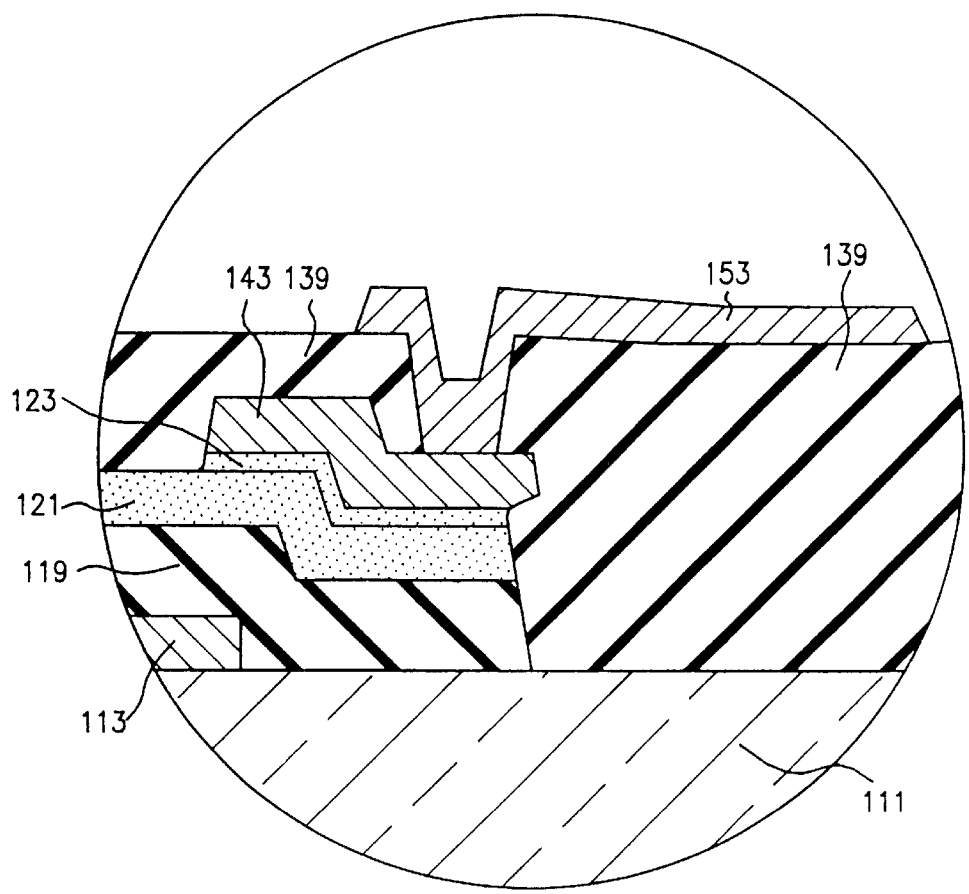

However, when an organic insulating material such as BCB, PFCB and fluorinated para-xylene is applied to form an organic protection layer 139 according to a feature of the preferred embodiment of the present invention, a smooth surface is formed on the substrate thereby eliminating the problem of the stepped profile. Because of the presence of the novel protection layer 139, a subsequent layer including the pixel electrode 153 and the pad connecting terminals 157 and 177 does not result in defects such as line disconnection (FIG. 6a and FIG. 6b).

EXAMPLE 2

According to Example 1, the surface of the semiconductor layer 121 makes contact with the organic protection layer 139 made of BCB, PFCB or fluorinated para-xylene (FIG. 5f). In this case, the instability at the interface between the organic material 139 and the semiconductor layer 121 may affect the performance of the TFT including the semiconductor layer.

In order to eliminate such problem, this example introduces the following method. The manufacturing steps are described in FIGS. 7a to 7c, since the prior steps are preferably the same as Example 1 up to the step shown in FIG. 5d.

Figure 7A:
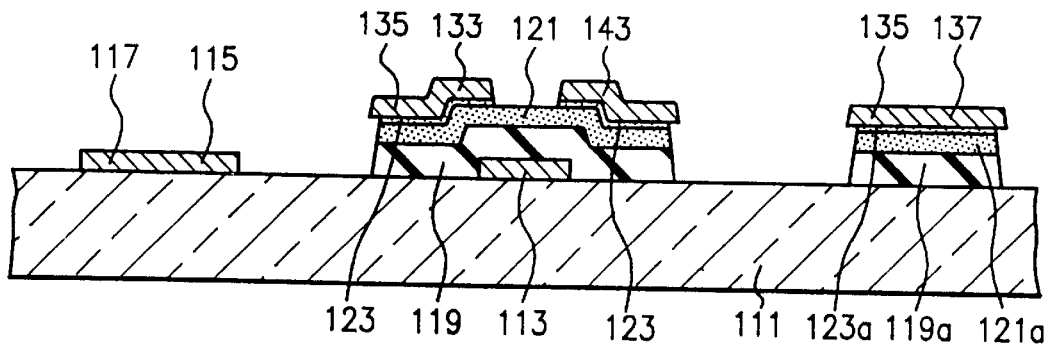
FIGS. 7a–7c are cross-sectional views showing the steps of manufacturing an active panel according to another preferred embodiment of the present invention including an inorganic protection layer.

After the source electrode 133, the drain electrode 143 and the source pad 137 are formed using the second masking process in Example 1 (FIG. 5d), the inorganic insulating layer 119a such as silicone nitride and silicone oxide, and the intrinsic semiconducting material 121a are patterned using a third masking process to form a semiconductor layer 121 as a channel layer over the gate electrode 113. At the same time, the gate pad 117 is exposed completely. The source pad 137 is also exposed completely and a dummy thin film layer formed of the impurity doped semiconducting material 123a and the semiconducting material 121a remain thereunder (FIG. 7a).

Figure 7B:
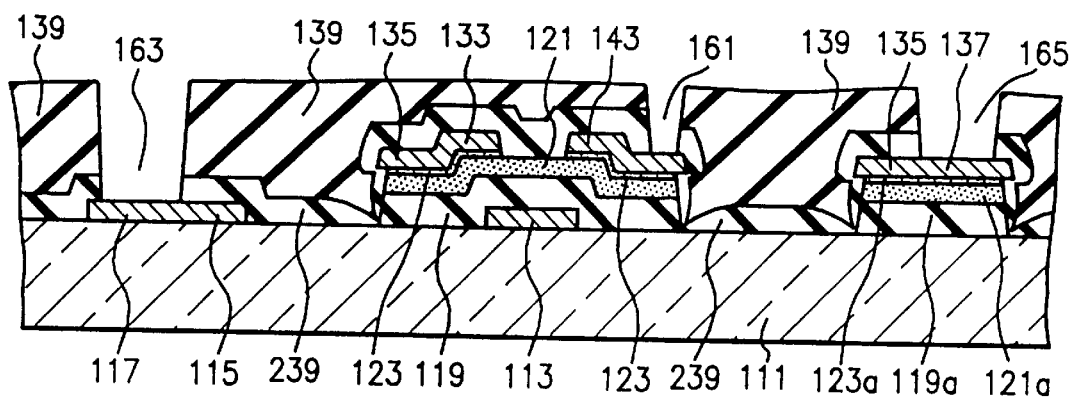

Then, an inorganic insulating material such as silicone nitride and silicone oxide is vacuum deposited on the substrate to form an inorganic protection layer 239. An organic material such as BCB, PFCB and fluorinated para-xylene is coated on the substrate including the inorganic protection layer 239 to form an organic protection layer 139. Next, using a fourth masking process, the organic protection layer 139 is patterned to form a drain contact hole 161, a gate pad contact hole 163 and a source pad contact hole 165. The drain contact hole 161 is formed to expose a portion of the drain electrode 143 by removing the portion of the organic protection layer 139 covering the drain electrode 143. The gate pad contact hole 163 is formed to expose a portion of the gate pad 117 by removing the portion of the organic protection layer 139 covering the gate pad 117. The source pad contact hole 165 is formed to expose a portion of the source pad 137 by removing the portion of the organic protection layer 139 covering the source pad 137 (FIG. 7b).

Figure 7C:
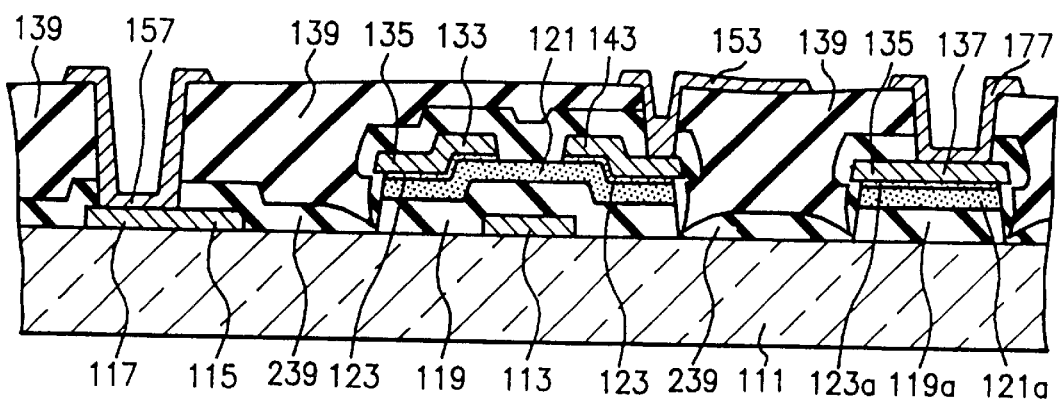

Next, indium tin oxide is vacuum deposited on the substrate including the organic protection layer 139 and, using a fifth masking process, is patterned to form a pixel electrode 153, a gate pad connecting terminal 157 and a source pad connecting terminal 177. The pixel electrode 153 is connected with the drain electrode 143 through the drain contact hole 161. The gate pad connecting terminal 157 is connected with the gate pad 117 through the gate pad contact hole 163. The source pad connecting terminal 177 is connected with the source pad 137 through the source pad contact hole 165 (FIG. 7c).

EXAMPLE 3

Figure 8A:
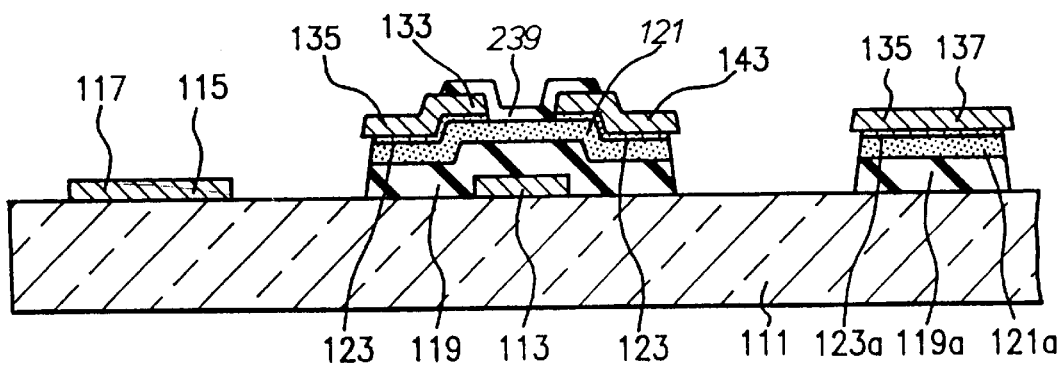
FIGS. 8a–8c are cross-sectional views showing the steps of manufacturing an active panel according to still another preferred embodiment of the present invention including an inorganic protection layer.
Figure 8B:
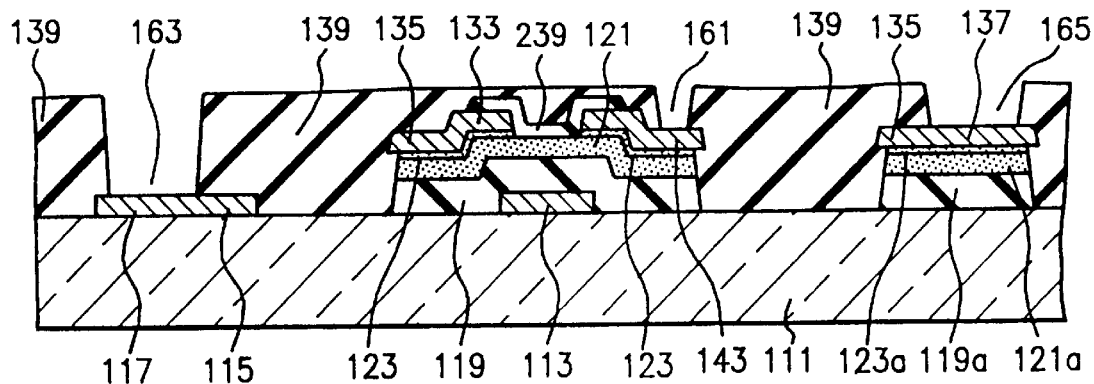
Figure 8C:
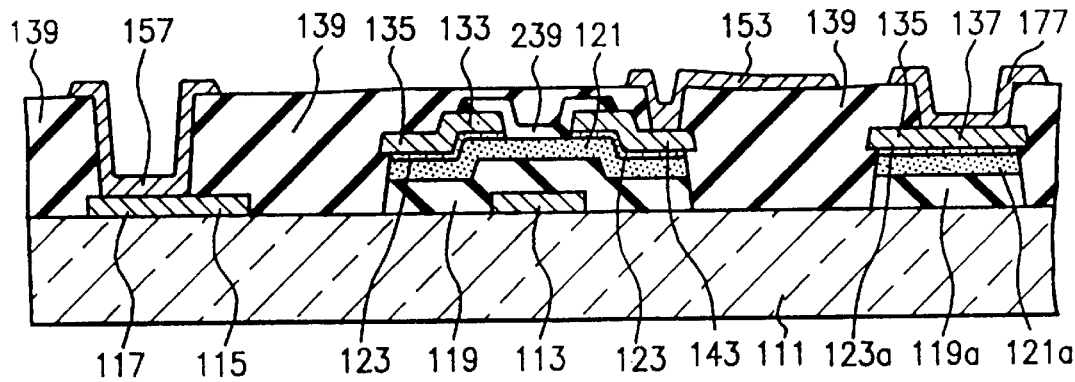

Prior to forming an organic protection layer 139 as in Example 2, made of BCB, PFCB or fluorinated para-xylene, an inorganic protection layer 239 made of silicone nitride or silicone oxide may be formed so as to only cover the exposed portion of the semiconductor layer 121. With reference to FIGS. 8a to 8c, a process following the manufacturing step of FIG. 5d in Example 1 is described in this example.

Using a third masking process, the inorganic insulating material 119a including silicone nitride or silicone oxide, and the intrinsic semiconducting material 121a are patterned to form a semiconductor layer 121 as a channel layer over the gate electrode 113 (FIG. 5d). Then, an inorganic material including silicone nitride or silicone oxide is vacuum deposited on the overall substrate. Using a fourth masking, the inorganic film is patterned to form an inorganic protection layer 239 covering only the exposed portion of the semiconductor layer 121 between the source electrode 133 and the drain electrode 143 (FIG. 8a).

An organic insulating material such as BCB, PFCB and fluorinated para-xylene is coated on the substrate including the source and drain electrode, and the inorganic protection layer 239, to form an organic protection layer 139. Using a fifth masking process, the organic protection layer 139 is patterned to form a drain contact hole 161, a gate pad contact hole 163 and a source pad contact hole 165 (FIG. 8b).

Indium tin oxide is vacuum deposited on the substrate including the organic protection layer 139 and, using a sixth masking process, patterned to form a pixel electrode 153, a gate pad connecting terminal 157 and a source pad connecting terminal 177 (FIG. 8c).

EXAMPLE 4

Figure 9A:
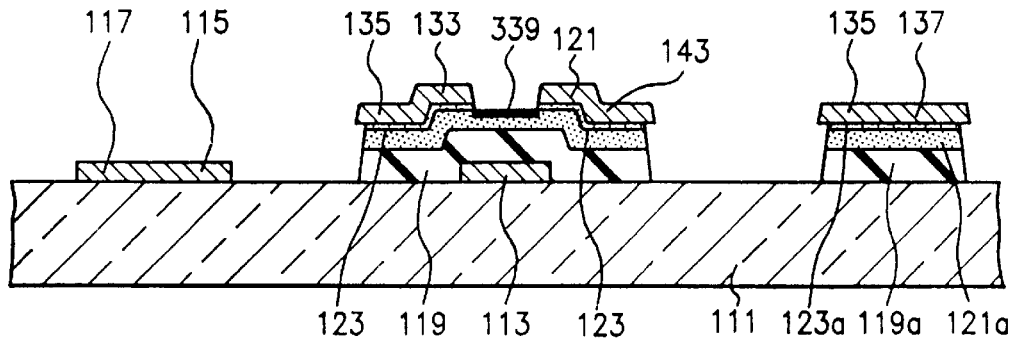
FIGS. 9a–9c are cross-sectional views showing the steps of manufacturing an active panel according to still another preferred embodiment of the present invention including $N_2$ plasma treatment.
Figure 9B:
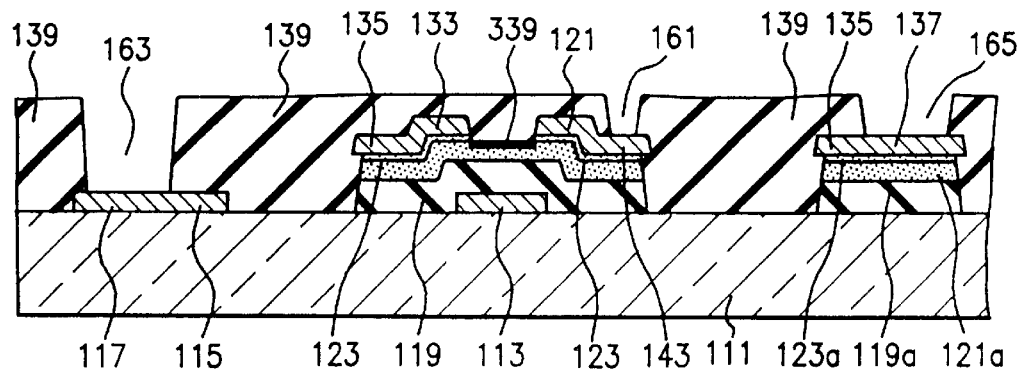
Figure 9C:
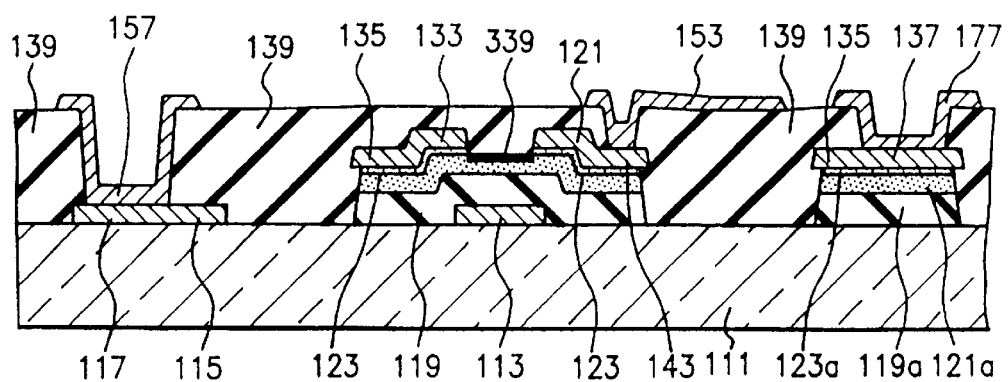

This example provides another method for eliminating the unstable contact between the semiconductor layer 121 and the organic protection layer 139 made of BCB, PFCB and fluorinated para-xylene. In Example 1, using a third masking process, the inorganic insulating material 119a including silicone nitride or silicone oxide, and the intrinsic semiconducting material 121a are patterned to form a semiconductor layer 121 as a channel layer. At this time, the gate pad 117 and the source pad 137 are completely exposed (FIG. 5d). Then, the surface of the semiconductor layer 121 exposed between the source electrode 133 and the drain electrode 143 is plasma treated using $N_2$ gas so as to form a silicone nitride layer 339 on the surface of the semiconductor layer 121, which provides a stable contact with an organic material coated thereon (FIGS. 9a–9c).

An organic insulating material such as BCB, PFCB and fluorinated para-xylene is coated on the substrate including the source electrode 133 and the drain electrode 143 to form an organic protection layer 139. Then, using a fourth masking process, the organic protection layer 139 is patterned to form a drain contact hole 161, a gate pad contact hole 163 and a source pad contact hole 165. The drain contact hole 161 exposes a portion of the drain electrode 143 by removing the organic protection layer 139 covering the drain electrode 143. The gate pad contact hole 163 exposes a portion of the gate pad 117 by removing the organic protection layer 139 covering the gate pad 117. The source pad contact hole 165 exposes a portion of the source pad 137 by removing the organic protection layer 139 covering the source pad 137 (FIG. 9b).

Indium tin oxide is vacuum deposited on the substrate including the organic protection layer 139 and, using a fifth masking process, patterned to form a pixel electrode 153, a gate pad connecting terminal 157 and a source pad connecting terminal 177. The pixel electrode 153 is connected with the drain electrode 143 through the drain contact hole 161. The gate pad connecting terminal 157 is connected with the gate pad 117 through the gate pad contact hole 163. The source pad connecting terminal 177 is connected with the source pad 137 through the source pad contact hole 165 (FIG. 9c).

EXAMPLE 5

In this example, compared with Example 1, the gate pad can be exposed completely without forming a gate pad contact hole, when the organic protection layer covering the gate pad is patterned. Then, line disconnection of the gate pad connecting terminal caused by ineffective deposition along the wall of the gate contact hole can be prevented. This example is described with reference to FIGS. 10a to 10c following the manufacturing step of FIG. 5a in Example 1.

Figure 10A:
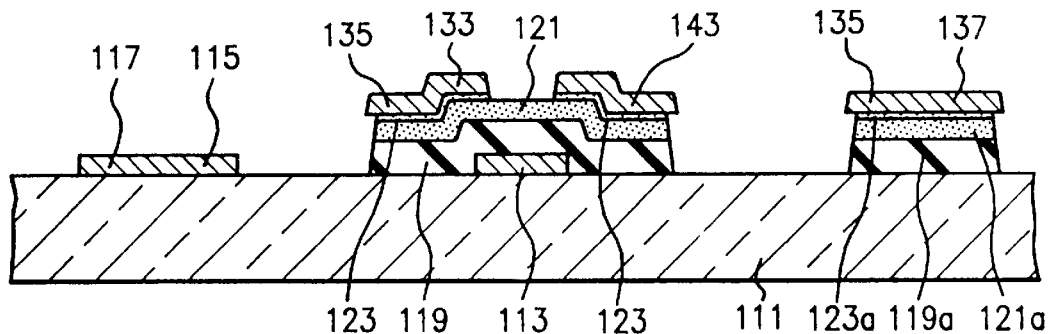
FIGS. 10a–10c are cross-sectional views showing the steps of manufacturing an active panel according to still another preferred embodiment of the present invention, including completely exposing the gate pad.

After the source electrode 133, the drain electrode 143 and the source pad 137 are formed using the second masking process in Example 1 (FIG. 5a), the inorganic insulating layer 119a such as silicone nitride and silicone oxide, and the intrinsic semiconducting material 121a are patterned using a third masking process to form a semiconductor layer 121 as a channel layer over the gate electrode 113. At the same time, the gate pad 117 is exposed completely. The source pad 137 is also exposed completely and a dummy thin film layer of the impurity doped semiconducting layer 123a and the semiconducting layer 121a remain thereunder (FIG. 10a).

Figure 10B:
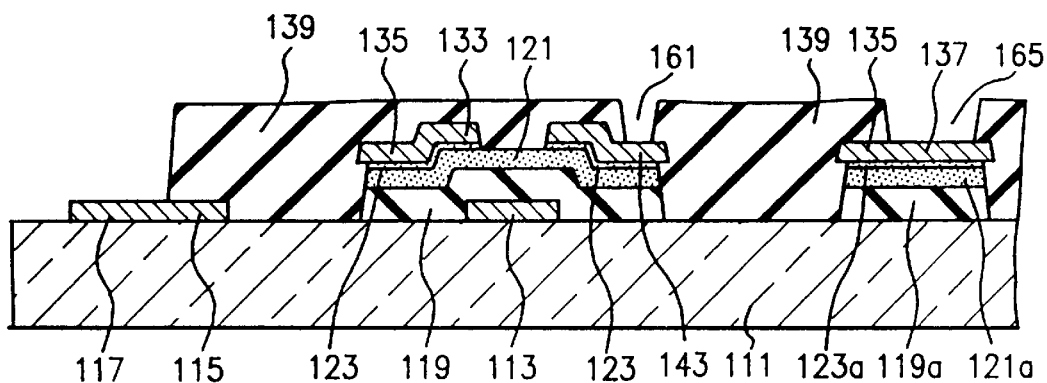

An organic insulating material such as BCB, PFCB and fluorinated para-xylene is coated on the substrate including the source and drain electrode to form an organic protection layer 139. Then, using a fourth masking process, the organic protection layer is patterned to form a drain contact hole 161 and a source pad contact hole 165. The drain contact hole 161 exposes a portion of the drain electrode 143 by removing the organic protection layer 139 covering the drain electrode 143. The source pad contact hole 165 exposes a portion of the source pad 137 by removing the organic protection layer 139 covering the source pad 137. At this time, the gate pad is exposed by removing the organic protection 139 covering the gate pad 117 (FIG. 10b).

Figure 10C:
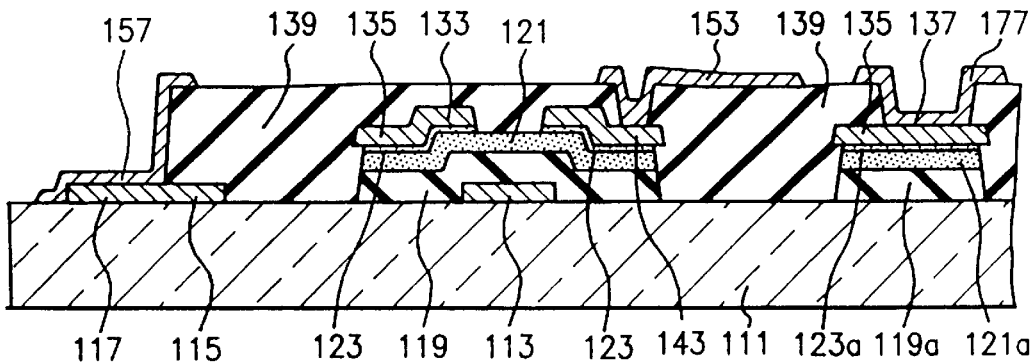

Indium tin oxide is vacuum deposited on the substrate including the organic protection layer 139 and, using a fifth masking process, patterned to form a pixel electrode 153, a gate pad connecting terminal 157 and a source pad connecting terminal 177. The pixel electrode 153 is connected with the drain electrode 143 through the drain contact hole 161. The gate pad connecting terminal 157 is connected with the gate pad 117 without the formation of a gate pad contact hole 163 as in previous examples. The source pad connecting terminal 177 is connected with the source pad 137 through the source pad contact hole 165 (FIG. 10c).

Similarly, though it is not presented in separate examples, this preferred embodiment can be applied to Examples 2 to 4 of manufacturing an active panel.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of manufacturing a liquid crystal display comprising the steps of:

providing a substrate;

forming a first conductive layer on the substrate;

depositing an insulating material and an intrinsic semiconductor material on the first conductive layer;

forming a second conductive layer and a doped semiconductor layer on the intrinsic semiconductor material;

patterning the insulating material and the intrinsic semiconductor material to expose a portion of the first conductive layer;

forming an organic protection layer on the second conductive layer; and forming a third conductive layer connected with a portion of the first conductive layer and a portion of the second conductive layer.

2. A method according to claim 1, wherein the step of forming the organic protection layer includes the step of coating the second conductive layer with an organic material.

3. A method according to claim 1, wherein the step of forming an organic protection layer includes the step of forming a plurality of contact holes in the organic protection layer which expose a portion of the first conductive layer and a portion of the second conductive layer.

4. A method according to claim 3, further comprising the step of connecting the third conductive layer with a portion of the first conductive layer and a portion of the second conductive layer through the contact holes formed in the organic protection layer.

5. A method according to claim 1, further comprising the step of forming an inorganic protection layer after the step of forming the doped semiconductor layer and the second conductive layer.

6. A method according to claim 1, further comprising the step of applying a plasma treatment with $N_2$ gas on the intrinsic semiconducting material prior to the step of forming the organic protection layer.

7. A method of manufacturing a liquid crystal display comprising the steps of:

providing a substrate;

forming a gate electrode, a gate bus line and a gate pad on the substrate using a first metal;

forming a semiconductor layer and a gate insulating layer;

depositing an insulating material and an intrinsic semiconductor material on the gate electrode, the gate bus line and the gate pad;

forming a source electrode, a drain electrode, a source bus line, a source pad and a doped semiconductor layer on the intrinsic semiconductor material;

forming an organic protection layer at least on the source electrode; and forming a pixel electrode, a gate pad connecting terminal and a source pad connecting terminal of a third conductive material on the organic protection layer such that the gate pad connecting terminal is connected with the gate pad and the source pad connecting terminal is connected with the source pad.

8. A method according to claim 7, further comprising the steps of patterning the organic protection layer to expose a portion of the drain electrode, a portion of the gate pad and a portion of the source pad.

9. A method according to claim 7, wherein the gate pad is exposed completely by removing the intrinsic semiconducting material and the insulating material.

10. A method according to claim 7, further comprising the step of forming an inorganic protection layer after forming the source electrode, the drain electrode, the source bus line, the source pad and the doped semiconductor layer.

11. A method according to claim 10, wherein the inorganic protection layer is formed to cover a portion of the semiconductor layer which is exposed between the source electrode and the drain electrode.

12. A method according to claim 7, further comprising the step of applying plasma treatment using $N_2$ gas, prior to the step of forming the organic protection layer.

13. A liquid crystal display comprising:

a substrate;

a first conductive layer on the substrate;

an insulating layer on the first conductive layer;

a semiconductor layer on the insulating layer;

a doped semiconductor layer on the semiconductor layer;

a second conductive layer on the doped semiconductor layer;

an organic protection layer on the second conductive layer; and a third conductive layer in contact with the first conductive layer and the second conductive layer.

14. A liquid crystal display according to claim 13, wherein the organic protection layer includes a plurality of contact holes exposing only a portion of the second conductive layer and a portion of the first conductive layer.

15. A liquid crystal display according to claim 14, wherein the third conductive layer contacts the first conductive layer and the second conductive layer through the contact holes of the organic protection layer.

16. A liquid crystal display according to claim 13, further comprising an inorganic protection layer between the semiconductor layer and the organic insulating layer.

17. A liquid crystal display according to claim 13, further comprising a thin film layer of silicone nitride located at an interface between the semiconductor layer and the organic protection layer.

18. A liquid crystal display according to claim 13, wherein the organic protection layer includes at least one of benzocyclobutene, perfluorocyclobutane and fluorinated para-xylene.

19. A liquid crystal display comprising:
- a substrate;
- a gate electrode, a gate bus line and a gate pad on the substrate;
- a gate insulating layer on the gate electrode, the gate bus line and the gate pad;
- a semiconductor layer on the gate insulating layer;
- a doped semiconductor layer on the semiconductor layer;
- a source electrode, a drain electrode, a source bus line and a source pad on the doped semiconductor layer;
- an organic protection layer on the source electrode, the drain electrode, the source bus line and the source pad, the organic protection layer having contact holes exposing a portion of the drain electrode, a portion of the gate pad and a portion of the source pad; and
- a pixel electrode on the organic protection layer and connected with the drain electrode, a gate pad connecting terminal connected with the gate pad and a source pad connecting terminal connected with the source pad through the contact holes.

20. A liquid crystal display according to claim 19, wherein the gate insulating layer covers only the gate electrode and the gate bus line such that the gate pad is exposed without having the gate insulating layer located thereon.

21. A liquid crystal display according to claim 19, further comprising an inorganic protection layer disposed between the semiconductor layer and the organic protection layer.

22. A liquid crystal display according to claim 21, wherein the inorganic protection layer fully covers a portion of the semiconductor layer which is exposed between the source electrode and the drain electrode.

23. A liquid crystal display according to claim 19, further comprising a thin film layer of silicone nitride at an interface between the semiconductor layer and the organic protection layer.

24. A liquid crystal display according to claim 19, the organic protection layer includes at least one of benzocyclobutene, perfluorocyclobutane and fluorinated para-xylene.

* * * * *